United States Patent
Chang et al.

(10) Patent No.: US 10,340,484 B2
(45) Date of Patent: Jul. 2, 2019

(54) HERMETIC PACKAGING MEMBER FOR FLEXIBLE ELECTROCHEMICAL DEVICE AND ELECTROCHEMICAL DEVICE INCLUDING THE HERMETIC PACKAGING MEMBER

(71) Applicant: Samsung Electronics Co., Ltd., Suwon-si, Gyeonggi-do (KR)

(72) Inventors: Jaejun Chang, Suwon-si (KR); Moonseok Kwon, Suwon-si (KR); Jaeman Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 239 days.

(21) Appl. No.: 15/162,685

(22) Filed: May 24, 2016

(65) Prior Publication Data
US 2017/0062775 A1    Mar. 2, 2017

(30) Foreign Application Priority Data
Aug. 31, 2015    (KR) .......................... 10-2015-0123199

(51) Int. Cl.
*H01M 2/02*    (2006.01)
*H01M 10/0525*    (2010.01)

(52) U.S. Cl.
CPC ......... *H01M 2/0267* (2013.01); *H01M 2/026* (2013.01); *H01M 2/0207* (2013.01); *H01M 10/0525* (2013.01); *H01M 2002/0297* (2013.01)

(58) Field of Classification Search
None
See application file for complete search history.

(56) References Cited

U.S. PATENT DOCUMENTS

| | | | |
|---|---|---|---|
| 8,785,030 B2 | 7/2014 | Ueda | |
| 9,325,028 B2 | 4/2016 | Kwon et al. | |
| 9,748,597 B2 | 8/2017 | Shon et al. | |
| 9,768,421 B2 | 9/2017 | Kwon et al. | |
| 2010/0227215 A1* | 9/2010 | Cheon ................. | H01M 2/0232 429/178 |
| 2013/0101884 A1 | 4/2013 | Ueda | |
| 2013/0136967 A1 | 5/2013 | Bhardwaj et al. | |
| 2014/0363702 A1* | 12/2014 | Kim ....................... | H01M 2/24 429/7 |
| 2014/0370345 A1 | 12/2014 | Maleki et al. | |
| 2015/0155528 A1* | 6/2015 | Takahashi .......... | H01M 2/0202 429/163 |

FOREIGN PATENT DOCUMENTS

| | | | |
|---|---|---|---|
| JP | 2000173559 A | | 6/2000 |
| JP | 2014179271 A | * | 9/2014 |
| JP | 2014179271 A | | 9/2014 |
| KR | 101106998 B1 | | 1/2012 |
| KR | 1020140035689 A | | 3/2014 |

* cited by examiner

*Primary Examiner* — Daniel S Gatewood
(74) *Attorney, Agent, or Firm* — Cantor Colburn LLP

(57) ABSTRACT

A hermetic packaging member for packaging and sealing an electrode assembly of an electrochemical device includes an edge unit and a receiving unit having a predetermined depth in a thickness direction of the hermetic packaging member from the edge unit to receive the electrode assembly therein. The receiving unit includes a slope portion connected to the edge unit and a plateau portion surrounded by the slope portion. The slope portion includes a plurality of ridges and a plurality of valleys defined between the plurality of ridges.

20 Claims, 12 Drawing Sheets

HERMETIC PACKAGING MEMBER FOR FLEXIBLE ELECTROCHEMICAL DEVICE AND ELECTROCHEMICAL DEVICE INCLUDING THE HERMETIC PACKAGING MEMBER

CROSS-REFERENCE TO RELATED APPLICATION

This application claims priority to Korean Patent Application No. 10-2015-0123199, filed on Aug. 31, 2015, and all the benefits accruing therefrom under 35 U.S.C. § 119, the content of which in its entirety is herein incorporated by reference.

BACKGROUND

1. Field

The disclosure relates to an electrochemical device, and more particularly, to a hermetic packaging member for a flexible electrochemical device and an electrochemical device including the hermetic packaging member.

2. Description of the Related Art

Recently, as the use of smart devices has increased, various wearable electronic devices have been developed. A wearable electronic device may have a flexible shape to increase the wearability thereof. A flexible electrochemical device may be used to supply power to the wearable electronic devices. The electrochemical device may be a device capable of storing energy and may include, for example, secondary batteries and super capacitors. Recently, a lithium secondary battery has been widely used as a power supply unit for a smart device.

A hermetic packaging member for packaging an electrode assembly may play an important role to implement a flexible electrochemical device. A hermetic packaging member for an electrochemical device may prevent the penetration of external moisture in the electrochemical device and the volatilization of an internal electrolyte to the outside. However, when the hermetic packaging member is damaged by a repetitive external force applied thereto, the hermetic packaging member may be degraded and thus the performance of the electrochemical device may be degraded.

SUMMARY

Embodiments of the invention relate to a hermetic packaging member for packaging and sealing an electrode assembly in a flexible electrochemical device and an electrochemical device including the hermetic packaging members.

According to an exemplary embodiment, a hermetic packaging member for packaging and sealing an electrode assembly of an electrochemical device includes: an edge unit; and a receiving unit having a predetermined depth in a thickness direction of the hermetic packaging member from the edge unit to receive the electrode assembly therein, where the receiving unit includes: a slope portion connected to the edge unit; and a plateau portion surrounded by the slope portion, and the slope portion includes a plurality of ridges and a plurality of valleys defined between the plurality of ridges.

In an exemplary embodiment, the hermetic packaging member may include a gas barrier layer on which the ridges and the valleys are defined.

In an exemplary embodiment, the ridges may extend from a boundary region between the slope portion and the edge unit.

In an exemplary embodiment, the ridges may be spaced apart from each other in the length direction of the hermetic packaging member.

In an exemplary embodiment, the ridges may extend in a direction substantially parallel to a width direction of the hermetic packaging member.

In an exemplary embodiment, a surface of the gas barrier layer located at the slope portion may have a minimum curvature radius of, for example, about 100 micrometers (μm) or greater.

In an exemplary embodiment, the ridges may continuously extend from a boundary region between the edge unit and the slope portion to a boundary between the slope portion and the plateau portion.

In an exemplary embodiment, the plateau portion may include a plurality of ridges and a plurality of valleys defined between the ridges.

In an exemplary embodiment, a ridge of the ridges of the slope portion may be connected to a ridge of the ridges of the plateau portion.

In an exemplary embodiment, the ridges may have a convex shape in a boundary region between the plateau portion and the slope portion.

In an exemplary embodiment, the valleys may be located below a plateau portion surface in a boundary region between the plateau portion and the slope portion.

According to another exemplary embodiment, an electrochemical device includes: an electrode assembly; and a hermetic packaging member for packaging and sealing the electrode assembly. In such an embodiment, the hermetic packaging member includes: an edge unit; and a receiving unit having a predetermined depth in a thickness direction of the hermetic packaging member from the edge unit to receive the electrode assembly therein, and the receiving unit includes: a slope portion connected to the edge unit; and a plateau portion surrounded by the slope portion, where the slope portion includes a plurality of ridges and a plurality of valleys defined between the plurality of ridges.

In an exemplary embodiment, the hermetic packaging member may include a gas barrier layer on which the ridges and the valleys are defined.

In an exemplary embodiment, the ridges may extend from a boundary region between the slope portion and the edge unit.

In an exemplary embodiment, the ridges may extend in a direction substantially parallel to a width direction of the hermetic packaging member, and may be spaced apart from each other in a direction parallel to the length direction of the hermetic packaging member.

In an exemplary embodiment, the ridges may continuously extend from a boundary region between the edge unit and the slope portion to a boundary between the slope portion and the plateau portion.

In an exemplary embodiment, the plateau portion may include a plurality of ridges and a plurality of valleys defined between the ridges.

In an exemplary embodiment, the hermetic packaging member may include a first hermetic packaging member which covers a top surface of the electrode assembly and a second hermetic packaging member which covers a bottom surface of the electrode assembly.

In an exemplary embodiment, each of the first and second hermetic packaging members may include the ridges and the valleys.

In an exemplary embodiment, the first hermetic packaging member may include the ridges and the valleys, and the second hermetic packaging member may have a flat shape.

BRIEF DESCRIPTION OF THE DRAWINGS

These and/or other features will become apparent and more readily appreciated from the following description of the exemplary embodiments, taken in conjunction with the accompanying drawings, in which.

DETAILED DESCRIPTION

Figure 1:
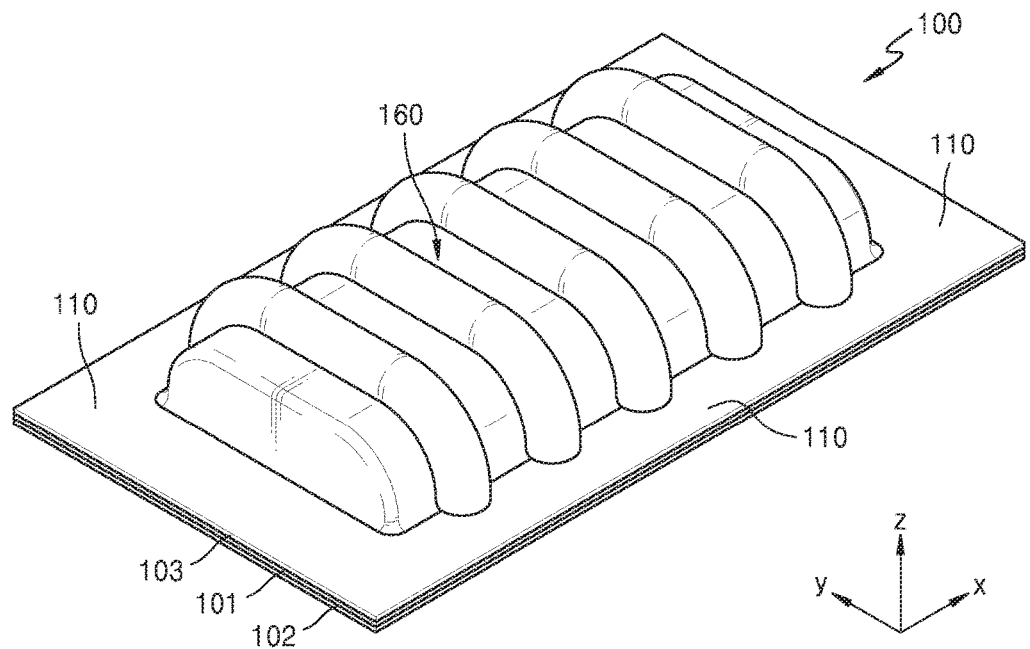
FIG. 1 is a top perspective view of a hermetic packaging member for an electrochemical device according to an exemplary embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments will be described in detail with reference to the accompanying drawings.

Figure 2:
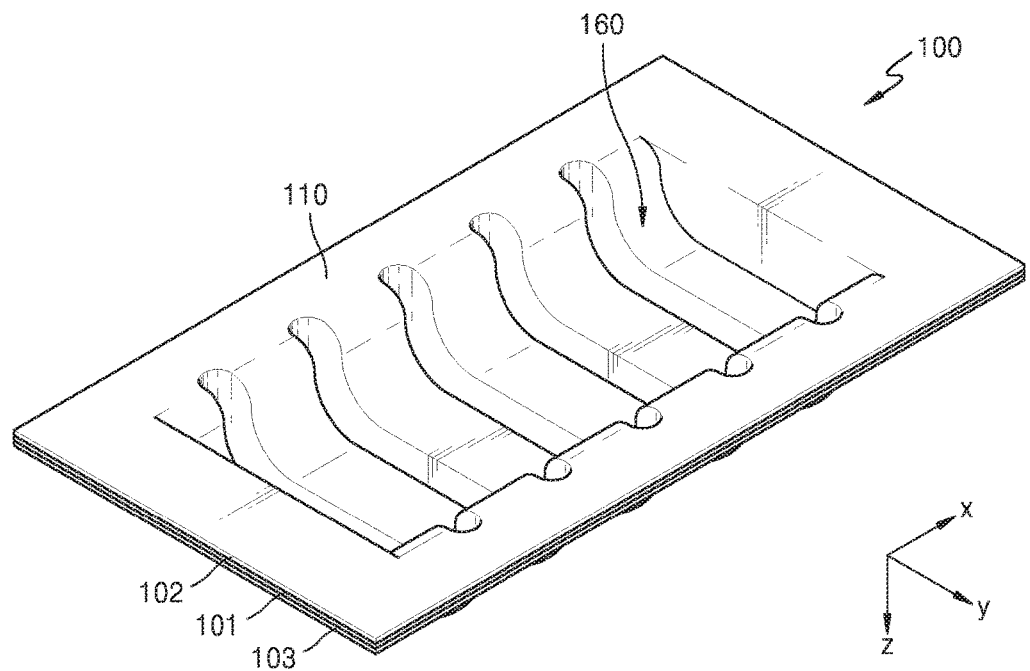
FIG. 2 is a bottom perspective view of the hermetic packaging member of FIG. 1.

FIG. 1 is a top perspective view of a hermetic packaging member for an electrochemical device according to an exemplary embodiment. FIG. 2 is a bottom perspective view of the hermetic packaging member of FIG. 1. Such an embodiment of the hermetic packaging member illustrated in FIG. 1 may be used for a flexible electrochemical device that may be repetitively bended or distorted.

Referring to FIGS. 1 and 2, an exemplary embodiment of a hermetic packaging member 100 may be used to package or seal an electrode assembly (not illustrated) and may be provided to cover a surface of the electrode assembly, for example, a top surface of the electrode assembly. The electrode assembly sealed by the hermetic packaging member 100 may have flexibility. However, the inventive concept is not limited thereto.

In an exemplary embodiment, the hermetic packaging member 100 may include a gas barrier layer 101. The gas barrier layer 101 may effectively prevent penetration of external moisture or oxygen through the hermetic packaging member 100 and volatilization of internal electrolyte to an outside thereof. In an exemplary embodiment, the gas barrier layer 101 may include, for example, at least one of a metal, an inorganic material, and a polymer. In such an embodiment, the inorganic material may include, for example, but are not limited to, a plurality of platy particles such as clay particles or graphene particles. In such an embodiment, the polymer may include, for example, polyvinylidene chloride ("PVDC"), ethylene vinyl alcohol ("EVOH"), polyketone, liquid crystal polymer ("LCP"), or fluoropolymer.

The hermetic packaging member 100 may further include a sealing layer 102 disposed on an inner surface of the gas barrier layer 101. The sealing layer 102 may be bonded with another layer to seal the electrode assembly. In an exemplary embodiment, the sealing layer 102 may include, for example, a thermoplastic resin. In such an embodiment, the thermoplastic resin may include, for example, but are not limited to, polyethylene ("PE") or polypropylene ("PP"). In an exemplary embodiment, a bonding layer (not illustrated) may be further disposed between the gas barrier layer 101 and the sealing layer 102. In an exemplary embodiment, the hermetic packaging member 100 may further include another layer disposed on the gas barrier layer 101. In one exemplary embodiment, for example, the hermetic packaging member 100 may further include an insulating layer 103 disposed on an outer surface of the gas barrier layer 101.

In FIG. 1, an x direction represents a length direction of the hermetic packaging member 100, a y direction represents a width direction of the hermetic packaging member 100, and a z direction represents a thickness direction of the hermetic packaging member 100. The hermetic packaging member 100 may include an edge unit 110 and a receiving unit 160 defined to extend in the thickness direction from the edge unit 110. In an exemplary embodiment, the edge unit 110 may be disposed to surround the receiving unit 160, and a surface of the edge unit 110 may be disposed to be substantially parallel to, for example, an xy plane illustrated in FIG. 1.

Figure 3A:
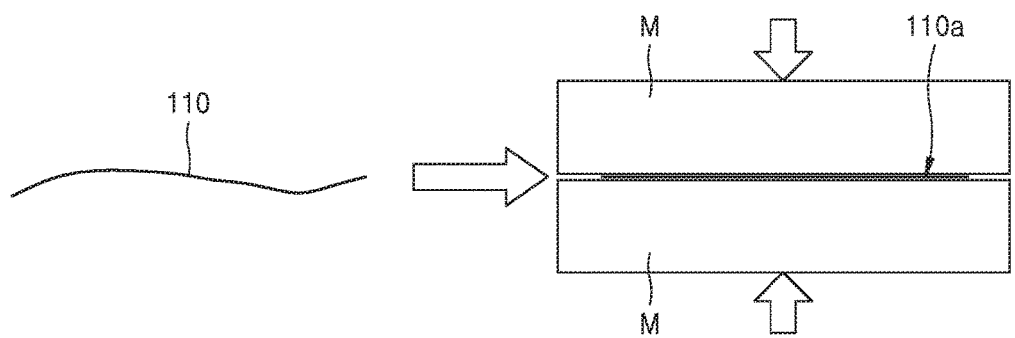
FIGS. 3A to 3C are diagrams illustrating a surface of an edge unit.
Figure 3B:
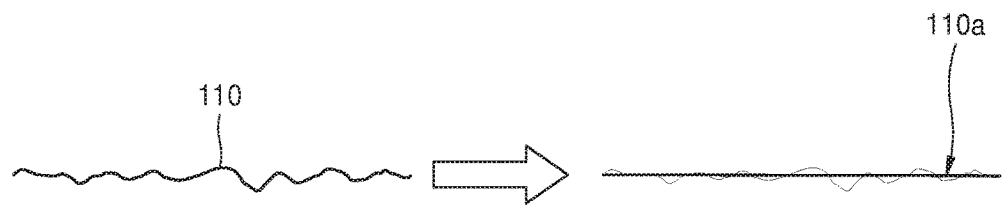
Figure 3C:
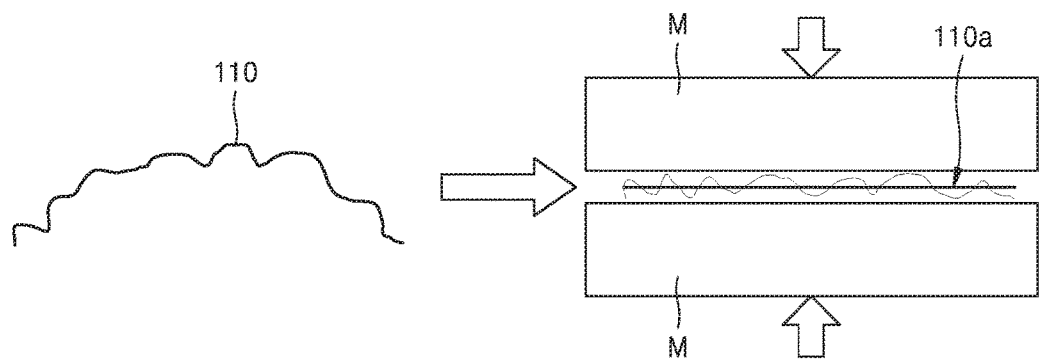

FIGS. 3A to 3C are diagrams illustrating the surface of the edge unit 110. Referring to FIGS. 3A to 3C, in an exemplary embodiment, the hermetic packaging member 100 is thin and flexible such that the hermetic packaging member 100 may have one or more curves. In such an embodiment, the surface of the edge unit 110 of the hermetic packaging member 100 may not be a plane surface. In such an embodiment, when the hermetic packaging member 100 is used to manufacture the electrochemical device, the edge unit 110 may be used for sealing. In a process for the sealing, the edge unit 110 may be generally processed in substantially close contact with a plane surface of a mechanism M. A surface formed by the edge unit 110 in substantially close contact with the plane surface of the mechanism M may be considered as a surface 110a of the edge unit 110.

In an exemplary embodiment, the edge unit 110 of the hermetic packaging member 100 may be repetitively bent to have a plurality of curves with different bending directions, or may have an irregular curved surface or a rough surface after the process for the sealing. In such an embodiment, a gentle curved surface or an average plane surface formed to fill the curves or the curved surface may be considered as the surface 110a of the edge unit 110. The edge unit 110 may be gently bent to have a curvature radius that is larger than a curvature radius of a valley or a ridge that will be described later. In such an embodiment, the surface 110a of the edge unit 110 may be defined by fixing the surface 110a of the edge unit 110 to be in a plane surface state.

The receiving unit 160 may be shaped to define a space for receiving the electrode assembly therein. In one exemplary embodiment, for example, the receiving unit 160 may be formed to have a predetermined depth by extending from the edge unit 110 in the thickness direction (e.g., the +z direction in FIG. 1) of the hermetic packaging member 100. As illustrated in FIG. 1, the receiving unit 160 of the hermetic packaging member 100 may be formed to protrude in the +z direction from the edge unit 110. The receiving unit 160 may be formed to have a depth corresponding to the thickness of the electrode assembly. The receiving unit 160 may be pre-formed through a molding process before the packaging of the electrode assembly. In such an embodiment, since the receiving unit 160 is pre-formed through a molding process, the receiving unit 160 may receive even a relatively thick electrode assembly. In one exemplary embodiment, for example, the receiving unit 160 may be formed to have a depth of about 200 micrometers (μm) or more, but not being limited thereto. In an alternative exemplary embodiment, the receiving unit 160 may be formed to have any depth corresponding to the thickness of an electrode assembly to be received therein.

Figure 4:
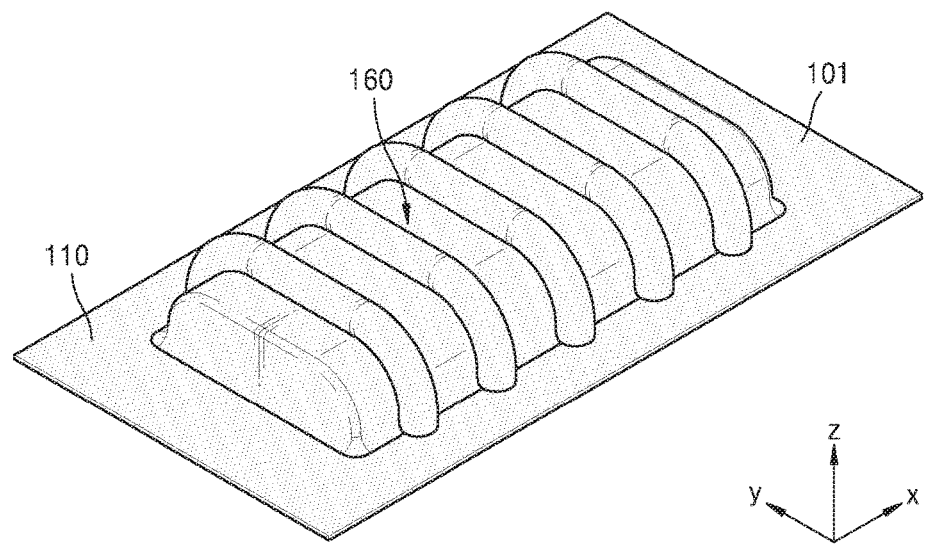
FIG. 4 is a perspective view illustrating a gas barrier layer of the hermetic packaging member illustrated in FIG. 1.

FIG. 4 is a perspective view illustrating the gas barrier layer 101 of the hermetic packaging member 100. Referring to FIG. 4, the gas barrier layer 101 may have the same shape as the hermetic packaging member 100. As illustrated in FIG. 1, the sealing layer 102 and the insulating layer 103 may have a corresponding shape to the gas barrier layer 101. However, the inventive concept is not limited thereto, and the sealing layer 102 and the insulating layer 103 may have a different shape from the gas barrier layer 101 in an alternative exemplary embodiment.

Figure 5:
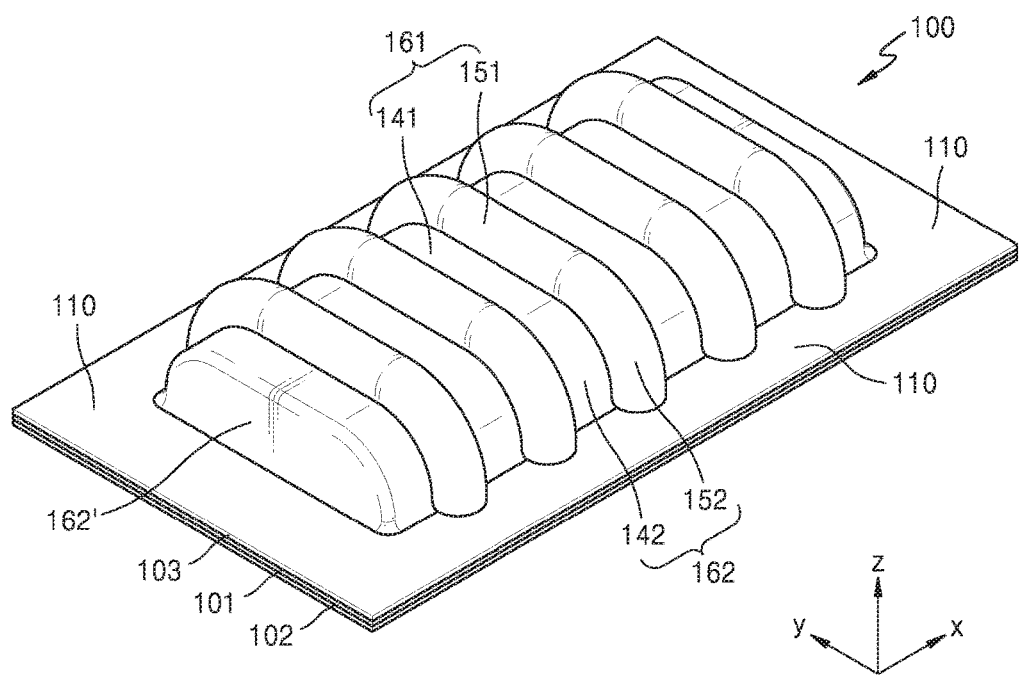
FIG. 5 is a perspective view illustrating an exemplary embodiment of the hermetic packaging member illustrated in FIG. 1.
Figure 6:
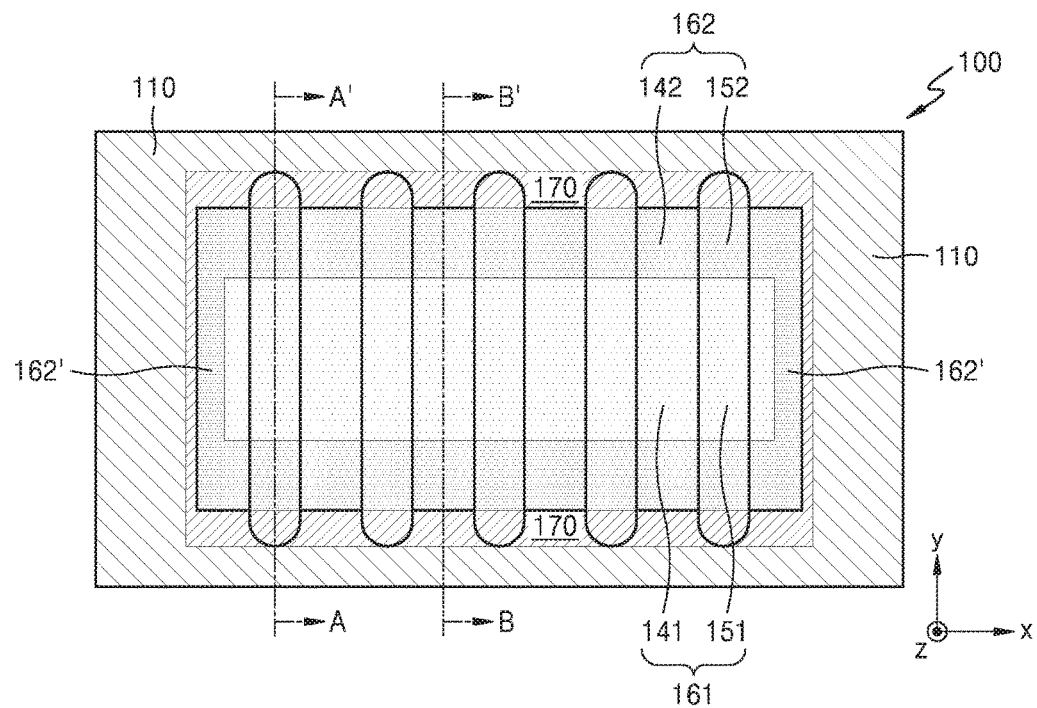
FIG. 6 is a plan view of the hermetic packaging member illustrated in FIG. 5.
Figure 7:
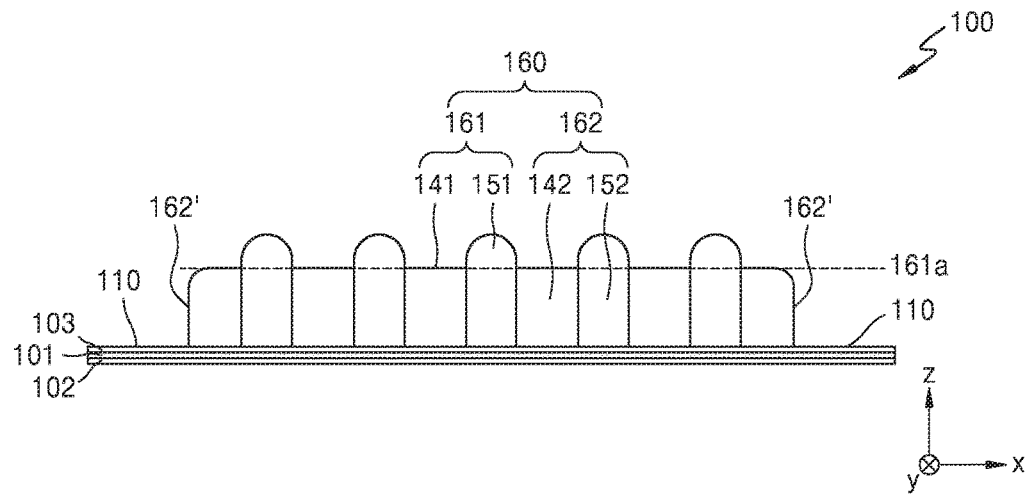
FIG. 7 is a side view of the hermetic packaging member illustrated in FIG. 5.

Hereinafter, the shape of the hermetic packaging member 100 will be described in greater detail with reference to FIGS. 5 to 7. FIG. 5 is a perspective view illustrating an exemplary embodiment of the hermetic packaging member 100. FIG. 6 is a plan view of the hermetic packaging member 100. FIG. 7 is a side view of the hermetic packaging member 100.

Referring to FIGS. 5 to 7, in an exemplary embodiment, the receiving unit 160 of the hermetic packaging member 100 may include a plateau portion 161 and slope portions 162 and 162' disposed around the plateau portion 161. In such an embodiment, the slope portions 162 and 162' may be located at the edge of the receiving unit 160 and connected to the edge unit 110. The slope portions 162 and 162' may be disposed at opposing sides of the receiving unit 160 in the length direction or the x direction, and opposing sides of the receiving unit 160 in the width direction or the y direction, and the plateau portion 161 may be disposed between the slope portions 162 and 162' and connected to the slope portions 162 and 162'.

The slope portion 162 located at the opposing sides of the receiving unit 160 in the length direction may include a plurality of ridges 152 and a plurality of valleys 142. The slope portion 162 may located at the opposing sides of the receiving unit 160 in the length direction include, for example, three or more ridges 152. However, the inventive concept is not limited thereto, and the slope portion 162 may include any other number of ridges 152 in an alternative exemplary embodiment.

The ridges 152 of the slope portion 162 may be arranged in the length direction of the receiving unit 160. In such an embodiment, the ridges 152 may be spaced apart from each other by a predetermined distance in the length direction of the receiving unit 160, and the valleys 142 may be defined between the ridges 152. In an alternative exemplary embodiment, at least some of the ridges 152 of the slope portion 162 may be arranged to be spaced apart from each other by a different distance from the other ridges 152. In an exemplary embodiment, the ridges 152 of the slope portion 162 may extend in a direction that is substantially parallel to the width direction of the receiving unit 160. In such an embodiment, as illustrated in FIG. 6, the extension direction of the ridges 152 may be the same as the width direction of the receiving unit 160.

In an exemplary embodiment, the ridges 152 of the slope portion 162 may extend from a boundary region 170 between the slope portion 162 and the edge unit 110. In such an embodiment, the ridges 152 may extend continuously from the boundary region 170 between the slope portion 162 and the edge unit 110 to a boundary between the slope portion 162 and the plateau portion 161.

In an exemplary embodiment, the plateau portion 161 may include a plurality of ridges 151 and a plurality of valleys 141. The ridges 151 of the plateau portion 161 may be arranged in the length direction of the receiving unit 160. In such an embodiment, the ridges 151 may be spaced apart from each other by a predetermined distance in the length direction of the receiving unit 160, and the valleys 141 may be defined between the ridges 151. In an alternative exemplary embodiment, at least some of the ridges 151 of the plateau portion 161 may be arranged at different intervals from the other ridges 151. In an exemplary embodiment, the ridges 151 of the plateau portion 161 may extend in the direction that is substantially parallel to the width direction of the receiving unit 160.

The ridges 151 of the plateau portion 161 may be connect to the ridges 152 of the slope portion 162, and the valleys 141 of the plateau portion 161 may be connect to the valleys 142 of the slope portion 162.

The plateau portion 161 may have a plateau portion surface 161a. In an exemplary embodiment, the plateau portion surface 161a may be defined by the ridges 151 of the plateau portion 161. In an exemplary embodiment, the plateau portion surface 161a may be defined to have a height from the edge unit 110, and may be substantially parallel to the surface 110a (see FIGS. 3A to 3C) of the edge unit 110. In such an embodiment, the plateau portion surface 161a may be a relatively wide flat surface located at the plateau portion 161, and may be substantially parallel to the surface 110a of the edge unit 110. When the edge unit 110 is bent, the plateau portion surface 161a may form a circumferential curved surface. When the plateau portion 161 has wrinkles or rumples, the plateau portion surface 161a may be defined by an imaginary surface connecting the bottom surfaces of the wrinkles or rumples.

Figure 8A:
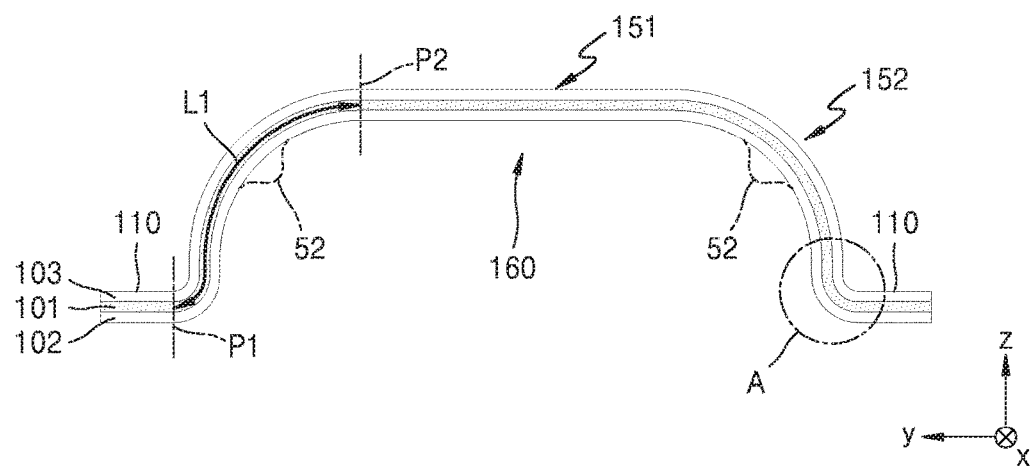
FIG. 8A is a cross-sectional view taken along line A-A' of FIG. 6.
Figure 8B:
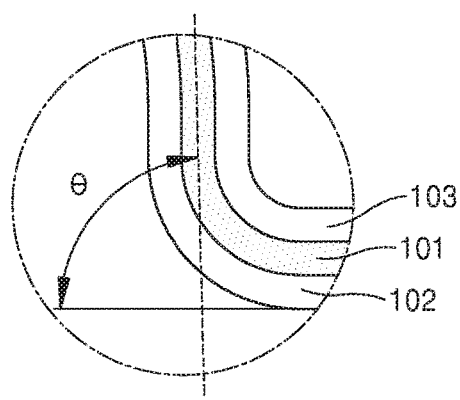
FIG. 8B is an enlarged view of the encircled portion A in FIG. 8A.
Figure 8C:
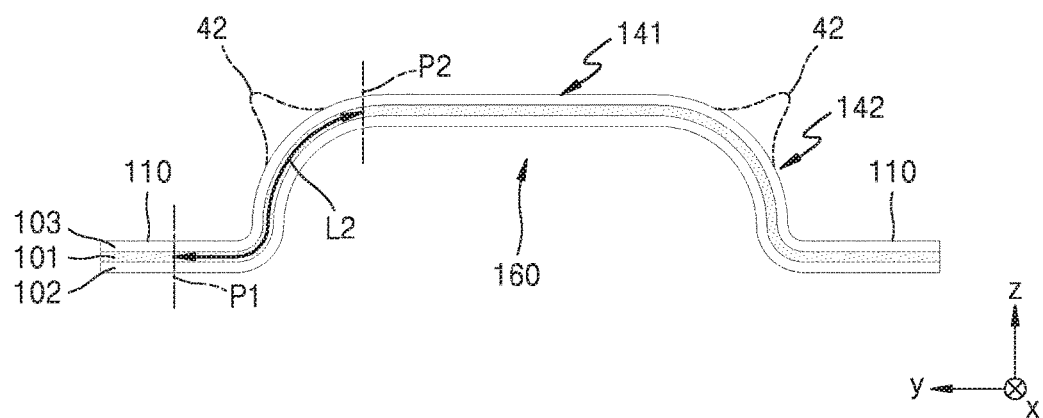
FIG. 8C is a cross-sectional view taken along line B-B' of FIG. 6.

FIG. 8A is a cross-sectional view taken along line A-A' of FIG. 6. FIG. 8B is an enlarged view of the encircled portion A in FIG. 8A. FIG. 8C is a cross-sectional view taken along line B-B' of FIG. 6.

Referring to FIG. 8A, a surface of the gas barrier layer 101 located at the slope portion 162 may have a minimum curvature radius of about 100 μm or more. In one exemplary embodiment, for example, the ridge 152 of the slope portion 162 may have a minimum curvature radius of about 100 μm or more. However, the inventive concept is not limited thereto. The minimum curvature radius may be measured at a certain-direction section or a certain position of the slope portion 162. The curvature radius of the slope portion 162 may be measured in various ways. In one exemplary embodiment, for example, the curvature radius of the slope portion 162 may be measured by epoxy-molding the slope portion 162, manufacturing a cross-sectional slice sample of the hermetic packaging member 100 by microtome equipment, and observing the cross-sectional slice sample of the hermetic packaging member 100 by microscope. When a curved portion at a surface of the gas barrier layer 101 has a curvature radius of less than 100 μm, a stress may be concentrated on the curved portion by a repetitive strain, such that the gas barrier layer 101 may be easily damaged.

In an exemplary embodiment, a maximum angle θ between the ridge 152 (e.g., the ridge 152 of the gas barrier layer 101) and the plane surface of the edge unit 110 at the ridge 152 of the slope portion 162 may be, for example, in a range of about 35° to about 120°. The maximum angle θ may be measured at the section perpendicular to the length direction, as shown in FIG. 8B. The slope of the ridge 152 of the slope portion 162 may vary according to positions, and the maximum angle θ may refer to an angle at the point where the ridge 152 has the maximum slope. In such an embodiment, where the maximum angle θ between the ridge 152 of the slope portion 162 and the plane surface of the edge unit 110 is 35° or more, the area occupied by the slope portion 162 may be reduced, such that the space of the receiving unit 160 of the electrochemical device may be efficiently used.

Referring to FIGS. 8A and 8C, in the region from a start position P1 of the ridge 152 of the slope portion 162 to a boundary position P2 between the slope portion 162 and the plateau portion 161, a length L1 of the ridge 152 may be greater than a length L2 of the valley 142. Herein, L1 and L2 may represent the lengths based on the gas barrier layer 101. In one exemplary embodiment, for example, in the region from the start position P1 of the ridge 152 of the slope portion 162 to the boundary position P2 between the slope portion 162 and the plateau portion 161, the length L1 of the ridge 152 may be about 1.1 times to about 1.5 times the length L2 of the valley 142. However, the inventive concept is not limited thereto. When the length L1 of the ridge 152 is smaller than the 1.1 times of the length L2 of the valley 142, the ridge 152 may not effectively function, such that the strain may not be effectively distributed. When the length L1 of the ridge 152 is greater than about 5 times of the length L2 of the valley 142, the space occupied by the ridge 152 may increase, such that the energy density thereof may degrade and also the hermetic packaging member 100 may be damaged in the molding process.

In an exemplary embodiment of the hermetic packaging member 100, as illustrated in FIG. 8A, the ridges 152 may be in a convex shape in a boundary region between the plateau portion 161 and the slope portion 162. In such an embodiment, as illustrated in FIG. 8C, the valleys 142 may be located below the plateau portion surface 161a in the boundary region between the plateau portion 161 and the slope portion 162. Accordingly, when the hermetic packaging member 100 is repetitively strained, the damage of the hermetic packaging member 100 may be effectively prevented. When the receiving unit 160 is not pre-formed, e.g., provided through a molding process before packing an electrode assembly, but the receiving unit is formed by packaging the electrode assembly using a conventional hermetic packaging member having only ridges and valleys arranged in the length direction and formed to extend in the width direction thereof, a portion corresponding to a portion 52 (see FIG. 8A) of the ridge may have a depressed shape in the boundary region between the plateau portion and the slope portion, and a portion corresponding to a portion 42 (see FIG. 8C) of the valley may protrude above the plateau portion surface 161a in the boundary region between the plateau portion and the slope portion. In such a conventional hermetic packaging member, the durability thereof may be degraded and thus the electrochemical device may be easily damaged by the repetitive strain. In an exemplary embodiment, where the ridges 152 are provided to have a convex shape without being depressed in the boundary region between the plateau portion 161 and the slope portion 162 or the valleys 142 are provided to be located below the plateau portion surface 161a in the boundary region between the plateau portion 161 and the slope portion 162, the durability thereof may be improved and thus the electrochemical device may not be easily damaged even by the repetitive strain.

Figure 9:
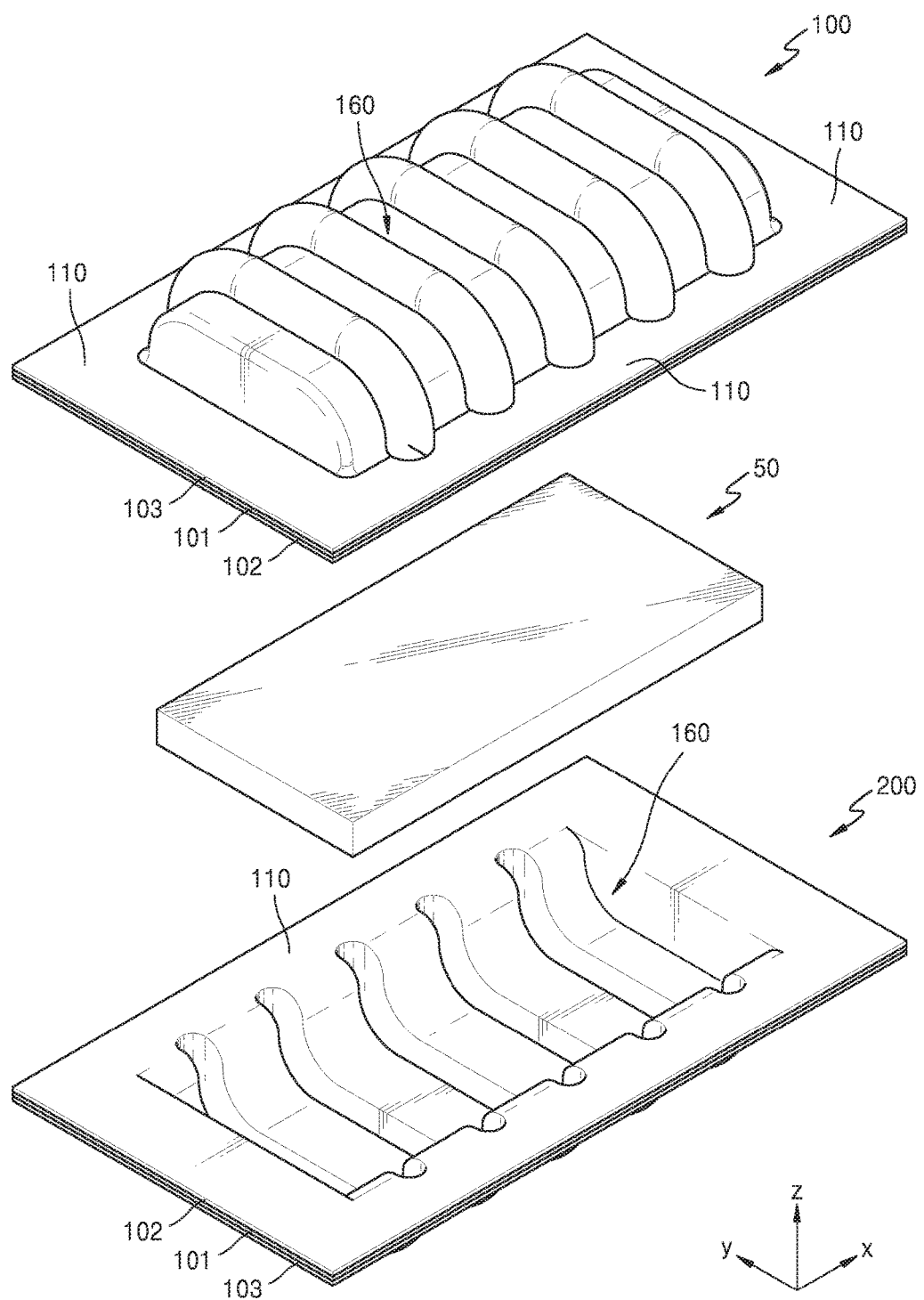
FIG. 9 is an exploded perspective view of an electrochemical device according to an exemplary embodiment.

FIG. 9 is an exploded perspective view of an electrochemical device according to an exemplary embodiment.

Referring to FIG. 9, in an exemplary embodiment of an electrochemical device, an electrode assembly 50 is disposed between first and second hermetic packaging members 100 and 200. In such an embodiment, the electrode assembly 50 may have flexibility. However, the inventive concept is not limited thereto. In such an embodiment, the first hermetic packaging member 100 may be the same as the exemplary embodiment of the hermetic packaging member 100 described herein, and any repetitive detailed description thereof will be omitted for conciseness. In an exemplary embodiment, the second hermetic packaging member 200 may have the same shape as the first hermetic packaging member 100. The first and second hermetic packaging members 100 and 200 may be disposed symmetrically with respect to the electrode assembly 50. In such an embodiment, the first hermetic packaging member 100 may be disposed to cover the top surface of the electrode assembly 50, and the second hermetic packaging member 200 may be disposed to cover the bottom surface of the electrode assembly 50.

The electrochemical device may be manufactured by inserting the electrode assembly 50 into the receiving unit 160 of the first and second hermetic packaging members 100 and 200, filling electrolyte thereinto, and then bonding the edge unit 110 of the first hermetic packaging member 100 and the edge unit 110 of the second hermetic packaging member 200 together. In an alternative exemplary embodiment, the first and second hermetic packaging members 100 and 200 may have different shapes from each other.

In such an embodiment, by pre-forming the receiving unit 160 for receiving the electrode assembly 50 to the predetermined depth in the thickness direction from the edge unit 110 in the first and second hermetic packaging members 100 and 200 through the molding process and providing the plurality of ridges 152 at the slope portion 162 of the receiving unit 160, the electrochemical device may have high durability even against the repetitive strain applied from the outside thereof.

In a conventional electrochemical device, where the receiving unit 160 is not pre-formed through the molding process before receiving the electrode assembly 50, the shape of the ridges may be strained at the hermetic packaging member portion contacting the edge portion of the electrode assembly 50 during the packaging of the electrode assembly 50 and thus the hermetic packaging member may be damaged by the repetitive strain. However, according to an exemplary embodiment, where the receiving unit 160 receiving the electrode assembly 50 is pre-formed in the thickness direction from the edge unit 110 in the first and second hermetic packaging members 100 and 200 that are formed through a molding process, the shape of the ridges 152 may be maintained without change in the boundary region 170 between the slope portion 162 and the edge unit 110 and the boundary region between the plateau portion 161 and the slope portion 162, that is, a region where the first and second hermetic packaging members 100 and 200 are adjacent to the edge portion of the electrode assembly 50. Thus, in such an embodiment, the damage of the first and second hermetic packaging members 100 and 200 may be effectively prevented even when the electrochemical device is repetitively strained.

In an exemplary embodiment, where the receiving unit 160 receiving the electrode assembly 50 is pre-formed to have a predetermined depth in the thickness direction from the edge unit 110 in the first and second hermetic packaging members 100 and 200 before the packaging of the electrode assembly 50, even the relatively thick electrode assembly 50 may be effectively packaged by the first and second hermetic packaging members 100 and 200. In such an embodiment, since the slope portion 162 of the receiving unit 160 may be formed at the relatively high angle, the area occupied by the slope portion 162 may be reduced and thus the space of the receiving unit 160 of the electrochemical device may be efficiently used. In an exemplary embodiment, the first and second hermetic packaging members 100 and 200 may be formed in using a single unitary unit or body. In such an embodiment, a portion of the single unitary body may be folded, one side on the folded portion may define the first hermetic packaging member 100, and the other side may define the second hermetic packaging member 200.

Figure 10:
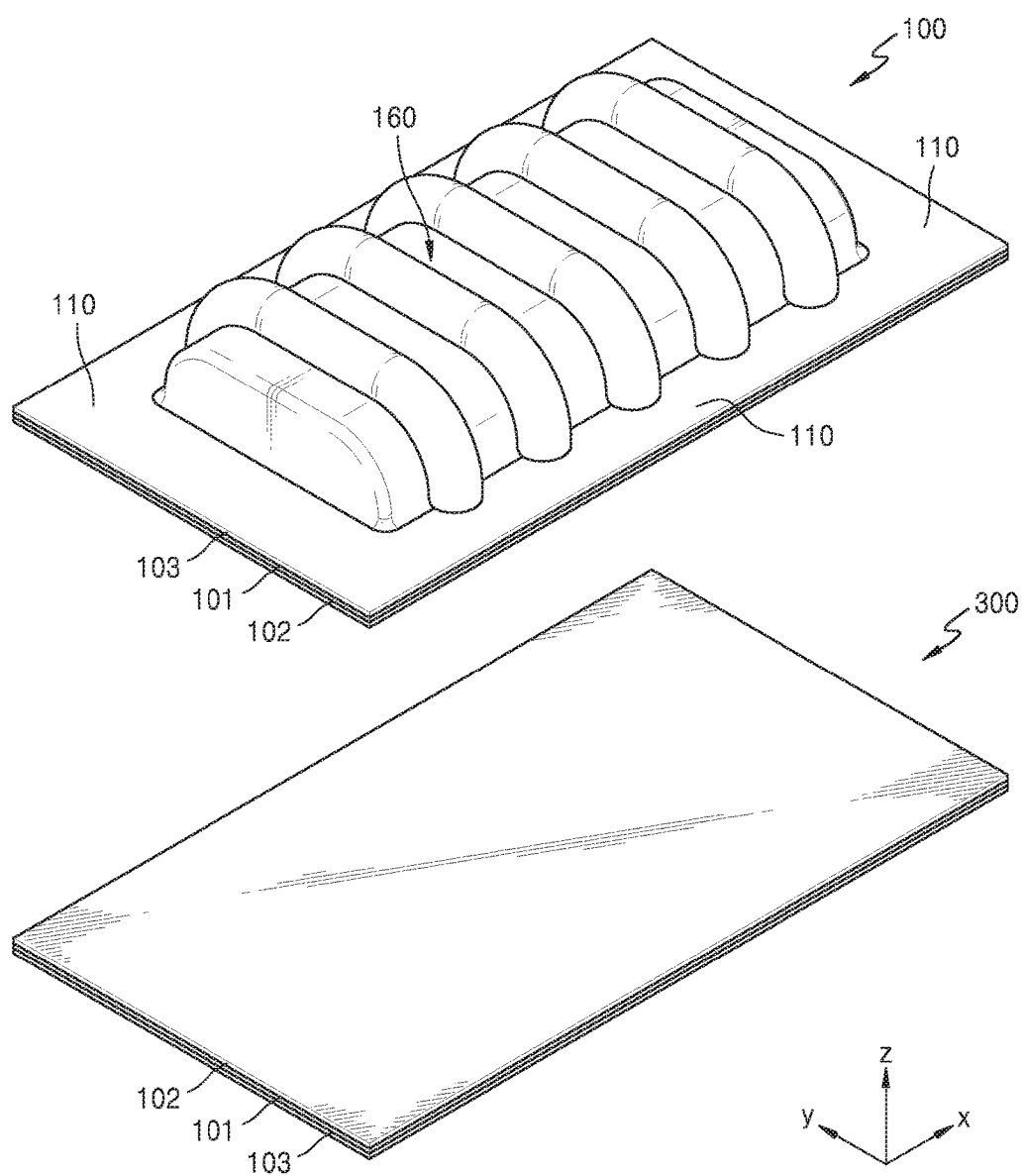
FIG. 10 is a perspective view of a hermetic packaging member for an electrochemical device according to an alternative exemplary embodiment.

FIG. 10 is a perspective view of a hermetic packaging member for an electrochemical device according to an alternative exemplary embodiment.

Referring to FIG. 10, in an exemplary embodiment, the hermetic packaging member may include first and second hermetic packaging members 100 and 300 disposed to face each other. In such an embodiment, the first hermetic packaging member 100 may cover the top surface of an electrode assembly (not illustrated), and the second hermetic packaging member 300 may cover the bottom surface of the electrode assembly.

In such an embodiment, the first hermetic packaging member 100 may be the same as the hermetic packaging member 100 illustrated in FIG. 1. The first hermetic packaging member 100 may include an edge unit 110 and a receiving unit 160 defined to have a predetermined depth in the thickness direction from the edge unit 110. In such an embodiment, the edge unit 110 may be disposed to surround the receiving unit 160, and a plane surface of the edge unit 110 may be substantially parallel to, for example, an xy plane illustrated in FIG. 10.

The receiving unit 160 may include a plateau portion 161 and slope portions 162 and 162' formed to surround the plateau portion 161. In such an embodiment, the slope portion 162 located the opposing sides at the width-direction (e.g., the y direction) of the receiving unit 160 may include a plurality of ridges 152 and a plurality of valleys 142. The ridges 152 of the slope portion 162 may be arranged in the length direction of the receiving unit 160. In such an embodiment, the ridges 152 may be spaced apart from each other in the length direction of the receiving unit 160, and the valleys 142 may be defined between the ridges 152. The ridges 152 of the slope portion 162 may extend in a direction that is substantially parallel to the width direction of the receiving unit 160.

In such an embodiment, the plateau portion 161 may include a plurality of ridges 151 and a plurality of valleys 141. The ridges 151 of the plateau portion 161 may be arranged in the length direction of the receiving unit 160. In such an embodiment, the ridges 151 may be disposed to be spaced apart from each other in the length direction of the receiving unit 160, and the valleys 141 may be defined between the ridges 151. In such an embodiment, the ridges 151 of the plateau portion 161 may extend in the direction that is substantially parallel to the width direction of the receiving unit 160. The ridges 151 of the plateau portion 161 may be connected to the ridges 152 of the slope portion 162, and the valleys 141 of the plateau portion 161 may be connected to the valleys 142 of the slope portion 162.

The second hermetic packaging member 300 may be disposed to face the first hermetic packaging member 100. In an exemplary embodiment, as shown in FIG. 10, the second hermetic packaging member 300 may have a different shape (e.g., a flat shape or a plate-like shape) from the first hermetic packaging member 100. In such an embodiment, the electrochemical device may be manufactured by inserting the electrode assembly (not illustrated) into the receiving unit 160 of the first hermetic packaging member 100, filling electrolyte thereinto, and then bonding the edge unit 110 of the first hermetic packaging member 100 to the flat-shaped second hermetic packaging member 200. The first and second hermetic packaging members 100 and 300 may be formed using a single unitary body. In such an embodiment, a portion of the single unitary body may be folded, one side on the folded portion may define the first hermetic packaging member 100, and the other side may define the second hermetic packaging member 300.

FIGS. 11A to 14 illustrate hermetic packaging members for an electrochemical device according to other alternative exemplary embodiments. The hermetic packaging members illustrated in FIGS. 11A to 14 may correspond to any one of the first and second hermetic packaging members that cover the electrode assembly.

Figure 11A:
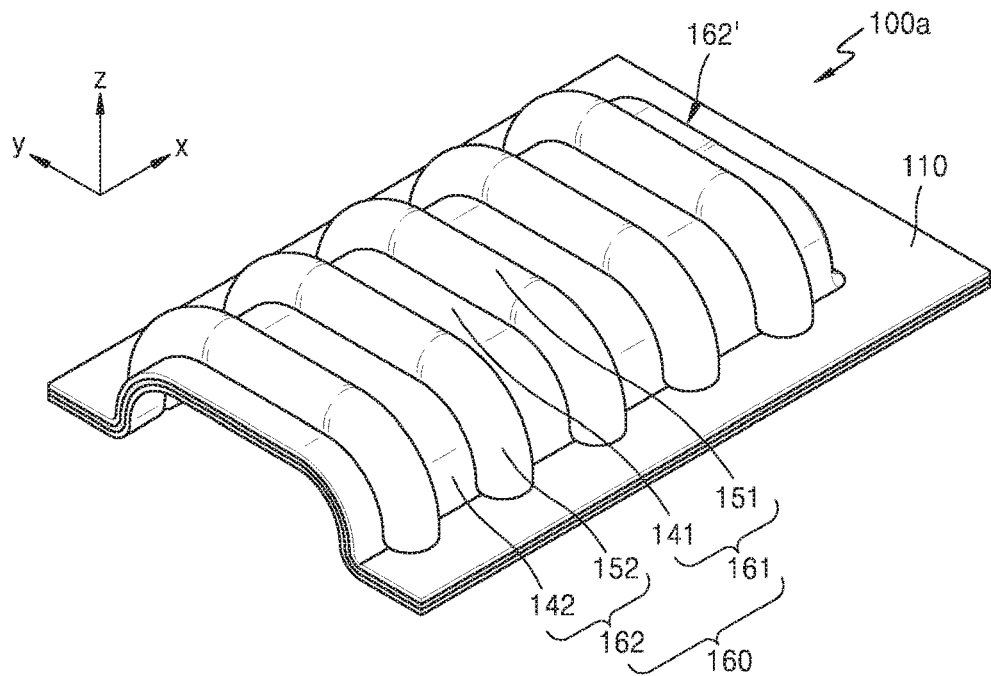
FIGS. 11A and 11B are perspective views of hermetic packaging members for an electrochemical device according to alternative exemplary embodiments.
Figure 11B:
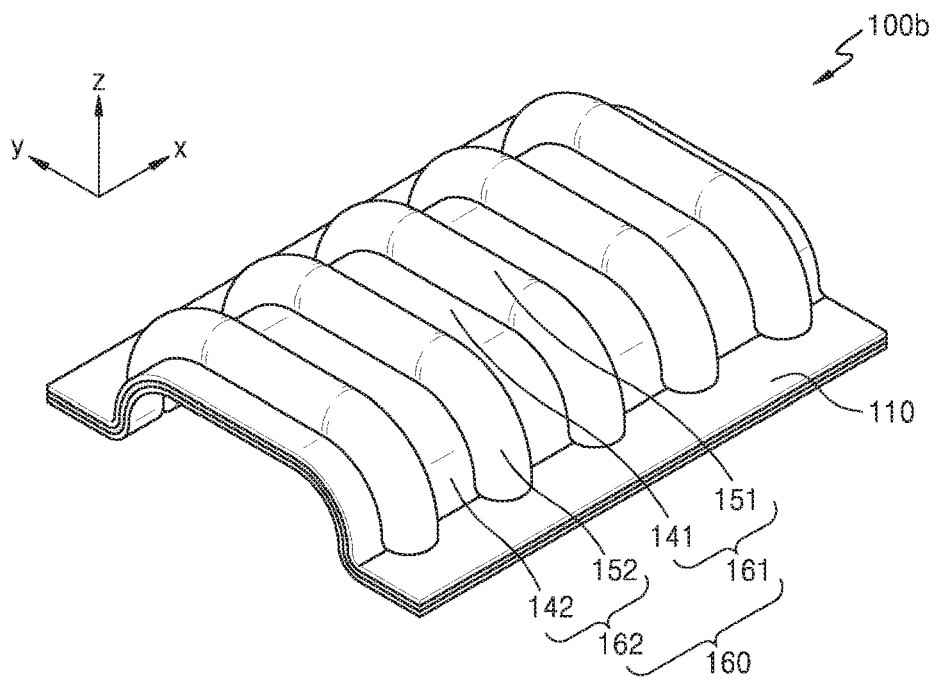

FIGS. 11A and 11B are perspective views of hermetic packaging members for an electrochemical device according to other exemplary embodiments.

Referring to FIG. 11A, in an exemplary embodiment, a hermetic packaging member 100a may include an edge unit 110 and a receiving unit 160, and the receiving unit 160 may include a plateau portion 161 and slope portions 162 and 162' formed around the plateau portion 161. In such an embodiment, the slope portions 162 and 162' may be located at the edge of the receiving unit 160 and connected to the edge unit 110. In such an embodiment, the slope portion 162 may be provided at opposing sides of the receiving unit 160 in the width direction of the hermetic packaging member 100a, and the slope portion 162' may be formed at only one side of the receiving unit 160 in the length direction of the hermetic packaging member 100a.

Referring to FIG. 11B, in an alternative exemplary embodiment, a hermetic packaging member 100b may include an edge unit 110 and a receiving unit 160, and the receiving unit 160 may include a plateau portion 161 and a slope portion 162 disposed around the plateau portion 161. In such an embodiment, the slope portion 162 may be located at the edge of the receiving unit 160 and connected to the edge unit 110. In such an embodiment, the slope portion 162 may be provided at each of opposing sides of the receiving unit 160 in the width direction of the hermetic packaging member 100b. However, in such an embodiment, no slope portion is formed at both sides of the receiving unit 160 in the length direction of the hermetic packaging member 100b.

By using such an embodiment of the hermetic packaging member 100a or 100b illustrated in FIG. 11A or 11B, the electrochemical device may be manufactured in the following way. In an exemplary embodiment, the electrochemical device may be manufactured by receiving the electrode assembly in the receiving unit 160 of the hermetic packaging member 100a or 100b illustrated in FIG. 11A or 11B and then pressing and bonding the opposing ends of the hermetic packaging member 100a or 100b in the length-direction to another hermetic packaging member to form a sealing structure thereof. In an exemplary embodiment, the electrochemical device may be manufactured by matching ends of the hermetic packaging member 100a or 100b illustrated in FIG. 11A or 11B to ends of another hermetic packaging member to be coupled with the hermetic packaging member 100a or 100b. In an exemplary embodiment, the other hermetic packaging member has a flat shape, and the electrochemical device may be manufactured by forming a sealing structure thereof by pressing by applying a compelling force thereto.

Figure 12:
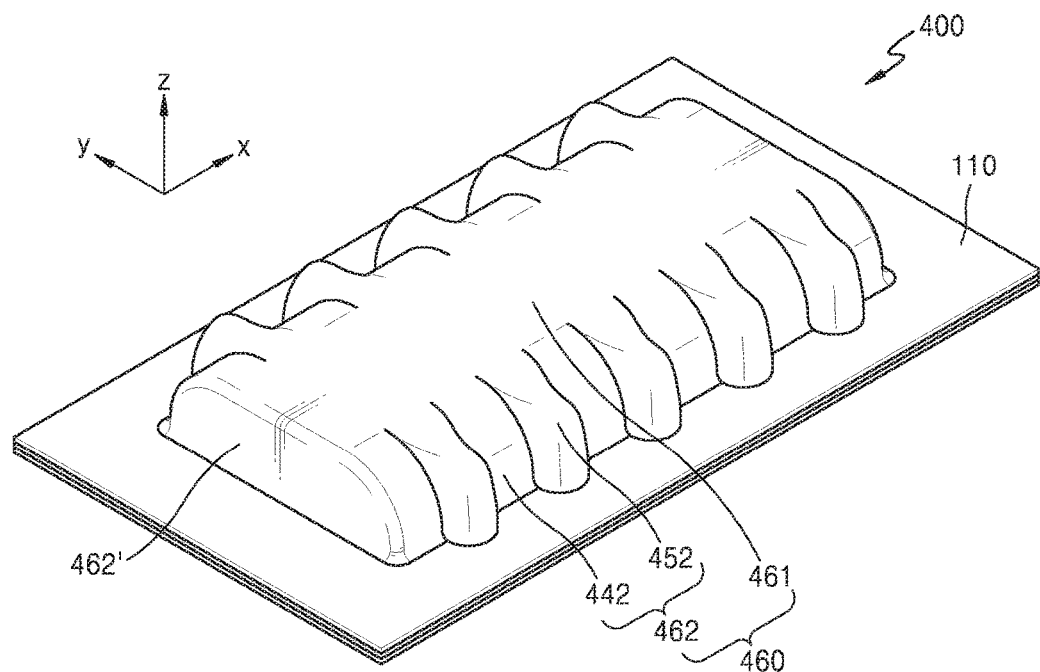
FIG. 12 is a perspective view of a hermetic packaging member for an electrochemical device according to another alternative exemplary embodiment.

FIG. 12 is a perspective view of a hermetic packaging member for an electrochemical device according to another alternative exemplary embodiment.

Referring to FIG. 12, in an exemplary embodiment of a hermetic packaging member 400 may include an edge unit 110 and a receiving unit 460 protruded to have a predetermined depth from the edge unit 110 in the thickness direction (e.g., the +z direction) or the hermetic packaging member 400. In such an embodiment, the edge unit 110 may be disposed to surround the receiving unit 460, and the plane surface of the edge unit 110 may be substantially parallel to, for example, the xy plane.

The receiving unit 460 may include a plateau portion 461 and slope portions 462 and 462' disposed to surround the plateau portion 461. The slope portions 462 and 462' may be located at the edge of the receiving unit 460 and connected to the edge unit 110. The slope portions 462 and 262' may be provided at opposing sides in the length-direction and opposing sides in the length-direction of the receiving unit 460.

The slope portion 462 located at the sides of the receiving unit 460 in the width-direction both may include a plurality of ridges 452 and a plurality of valleys 442. The ridges 452 of the slope portion 462 may be arranged in the length direction of the receiving unit 460. In such an embodiment, the ridges 452 may be spaced apart from each other in the length direction of the receiving unit 460, and the valleys 442 may be defined between the ridges 452. The ridges 452 of the slope portion 462 may extend in the direction that is substantially parallel to the width direction of the receiving unit 460.

The ridges 452 of the slope portion 462 may extend from the boundary region between the slope portion 462 and the edge unit 110, and the ridges 452 may continuously extend from the boundary region between the slope portion 462 and the edge unit 110 to the boundary between the slope portion 462 and the plateau portion 461. In an exemplary embodiment, as shown in FIG. 12, the plateau portion 461 may have a flat shape. In such an embodiment, the plateau portion 461 may not include a plurality of ridges.

Figure 13:
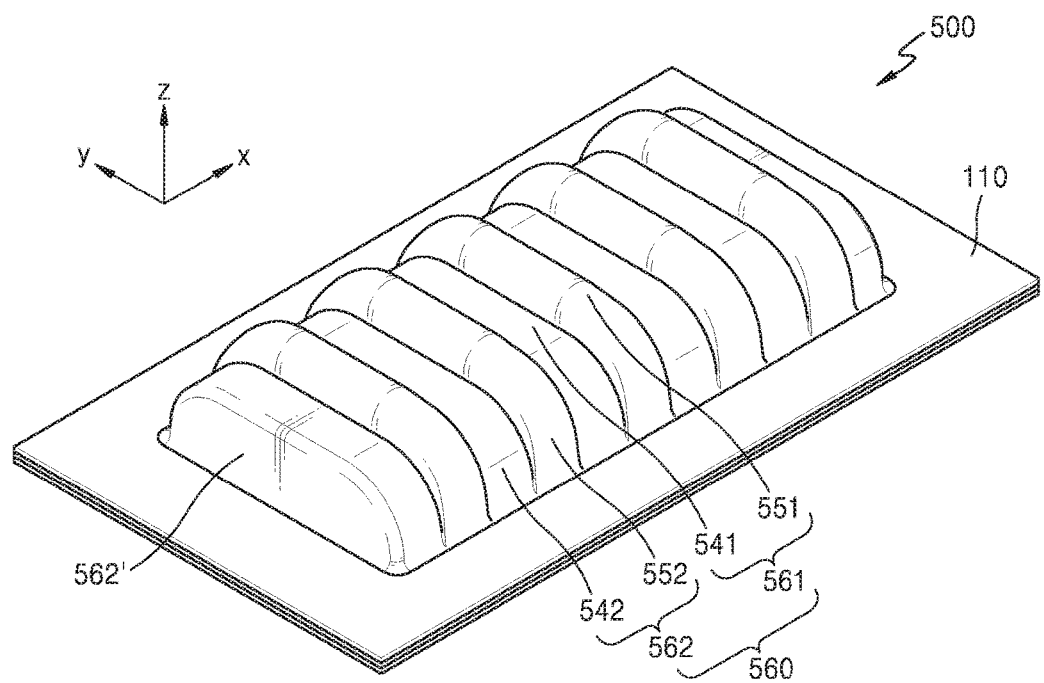
FIG. 13 is a perspective view of a hermetic packaging member for an electrochemical device according to another alternative exemplary embodiment.

FIG. 13 is a perspective view of a hermetic packaging member for an electrochemical device according to another alternative exemplary embodiment.

Referring to FIG. 13, in an exemplary embodiment, a hermetic packaging member 500 may include an edge unit 110 and a receiving unit 560 protruded to have a predetermined depth from the edge unit 110 in the thickness direction of the hermetic packaging member 500. The receiving unit 560 may include a plateau portion 561 and slope portions 562 and 562' disposed to surround the plateau portion 561. The slope portions 562 and 562' may be located at the edge of the receiving unit 560 and connected to the edge unit 110.

The slope portion 562 located at the sides of the receiving unit 560 in width-direction may include a plurality of ridges 552 and a plurality of valleys 542. The ridges 552 of the slope portion 562 may be arranged in the length direction of the receiving unit 560. In such an embodiment, the ridges 552 may be spaced apart from each other in the length direction of the receiving unit 560, and the valleys 542 may be defined between the ridges 552. The ridges 552 of the slope portion 562 may extend in the direction that is substantially parallel to the width direction of the receiving unit 560.

The ridges 552 of the slope portion 562 may extend from the boundary region between the slope portion 562 and the edge unit 110. In such an embodiment, the ridges 552 may continuously extend from the boundary region between the slope portion 562 and the edge unit 110 to the boundary between the slope portion 562 and the plateau portion 561. In such an embodiment, as shown in FIG. 13, the ridges 552 of the slope portion 562 may have a height that increases gradually from the boundary region between the slope portion 562 and the edge unit 110 to the boundary between the slope portion 562 and the plateau portion 561.

The plateau portion 561 may include a plurality of ridges 551 and a plurality of valleys 541. The ridges 551 of the plateau portion 561 may be arranged in the length direction of the receiving unit 560. In an exemplary embodiment, the ridges 551 may be spaced apart from each other in the length direction of the receiving unit 560, and the valleys 541 may be defined between the ridges 551. In such an embodiment, the ridges 551 of the plateau portion 561 may extend in the direction that is substantially parallel to the width direction of the receiving unit 560. The ridges 551 of the plateau portion 561 may be connected to the ridges 552 of the slope portion 562, and the valleys 541 of the plateau portion 561 may be connected to the valleys 542 of the slope portion 562.

Figure 14:
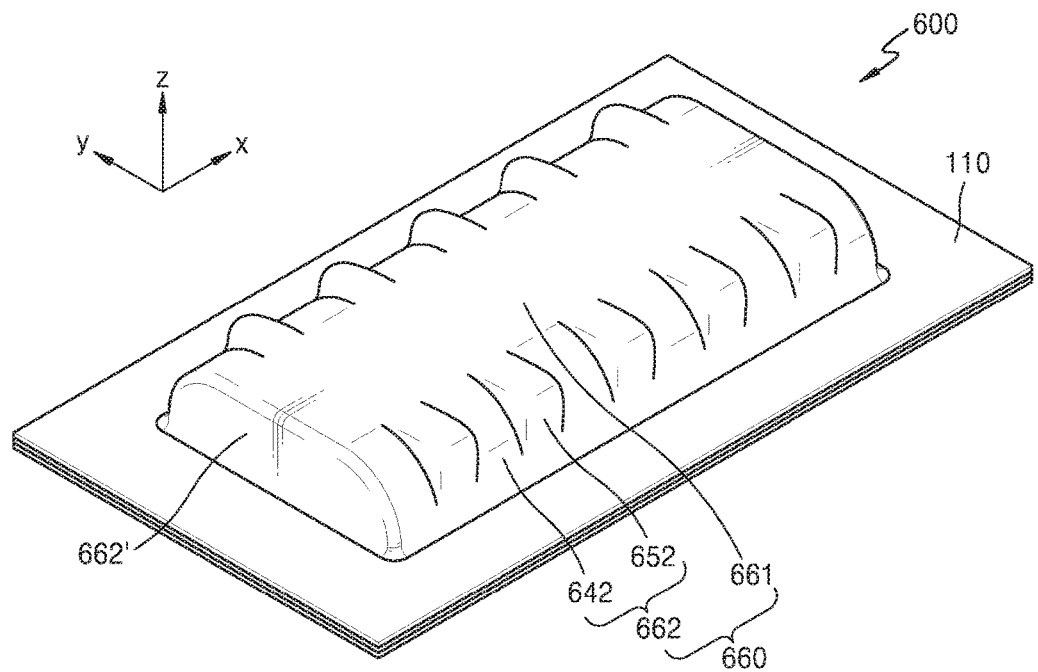
FIG. 14 is a perspective view of a hermetic packaging member for an electrochemical device according to another alternative exemplary embodiment.

FIG. 14 is a perspective view of a hermetic packaging member for an electrochemical device according to another alternative exemplary embodiment.

Referring to FIG. 14, in an exemplary embodiment, a hermetic packaging member 600 may include an edge unit 110 and a receiving unit 660 protruded to have a predetermined depth from the edge unit 110 in the thickness direction of the hermetic packaging member 600. The receiving unit 660 may include a plateau portion 661 and slope portions 662 and 662' disposed to surround the plateau portion 661. The slope portions 662 and 662' may be located at the edge of the receiving unit 660 and connected to the edge unit 110.

The slope portion 662 located at the sides of the receiving unit 660 in the width direction may include a plurality of ridges 652 and a plurality of valleys 642. The ridges 652 of the slope portion 662 may be arranged in the length direction of the receiving unit 660. In such an embodiment, the ridges 652 may be spaced apart from each other in the length direction of the receiving unit 660, and the valleys 642 may be defined between the ridges 652. The ridges 652 of the slope portion 662 may extend in the direction that is substantially parallel to the width direction of the receiving unit 660.

The ridges 652 of the slope portion 662 may extend from the boundary region between the slope portion 662 and the edge unit 110. In an exemplary embodiment, the ridges 652 may continuously extend from the boundary region between the slope portion 662 and the edge unit 110 to the boundary between the slope portion 662 and the plateau portion 661. In an exemplary, the ridges 652 of the slope portion 662 may have heights that gradually vary, e.g., increase or decrease, from the boundary region between the slope portion 662 and the edge unit 110 to the boundary between the slope portion 662 and the plateau portion 661. In such an embodiment, the plateau portion 661 surrounded by the slope portion 662 may have a flat shape. In such an embodiment, the plateau portion 661 may not include a plurality of ridges.

Figure 15:
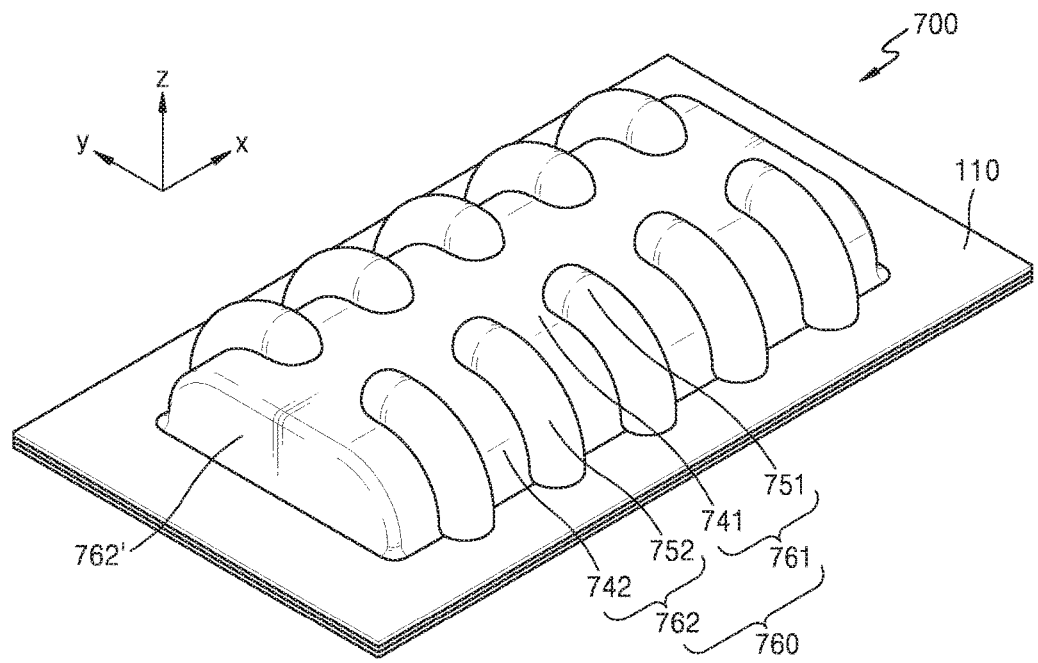
FIG. 15 is a perspective view of a hermetic packaging member for an electrochemical device according to another alternative exemplary embodiment.

FIG. 15 is a perspective view of a hermetic packaging member for an electrochemical device according to another alternative exemplary embodiment.

Referring to FIG. 15, in an exemplary embodiment, a hermetic packaging member 700 may include an edge unit 110 and a receiving unit 760 protruded to have a predetermined depth from the edge unit 110 in the thickness direction of the hermetic packaging member 700. The receiving unit 760 may include a plateau portion 761 and slope portions 762 and 762' disposed to surround the plateau portion 761. The slope portions 762 and 762' may be located at the edge of the receiving unit 760 and connected to the edge unit 110.

The slope portion 762 located at the sides of the receiving unit 760 in the width-direction may include a plurality of ridges 752 and a plurality of valleys 742. The ridges 752 of the slope portion 762 may be arranged in the length direction of the receiving unit 760. In such an embodiment, the ridges 752 may be spaced apart from each other in the length direction of the receiving unit 760, and the valleys 742 may be defined between the ridges 752. The ridges 752 of the slope portion 762 may extend in the direction that is substantially parallel to the width direction of the receiving unit 760. The ridges 752 of the slope portion 762 may extend from the boundary region between the slope portion 762 and the edge unit 110. In an exemplary embodiment, the ridges 752 may continuously extend from the boundary region between the slope portion 762 and the edge unit 110 to the boundary between the slope portion 762 and the plateau portion 761.

The plateau portion 761 may include a plurality of ridges 751 and a plurality of valleys 741. The ridges 751 of the plateau portion 761 may extend in the direction that is substantially parallel to the width direction of the receiving unit 760. The ridges 751 may be arranged to be spaced apart from each other in the length direction of the receiving unit 760. In such an embodiment, as shown in FIG. 15, the ridges 751 may be arranged to be spaced apart from each other in the width direction of the receiving unit 760. Thus, the valleys 741 of the plateau portion 761 may be defined between the ridges 751 spaced apart from each other in the length direction of the receiving unit 760, and between the ridges 751 spaced apart from each other in the width direction of the receiving unit 760. In such an embodiment, the ridges 751 of the plateau portion 761 may be connected to the ridges 752 of the slope portion 762.

Figure 16:
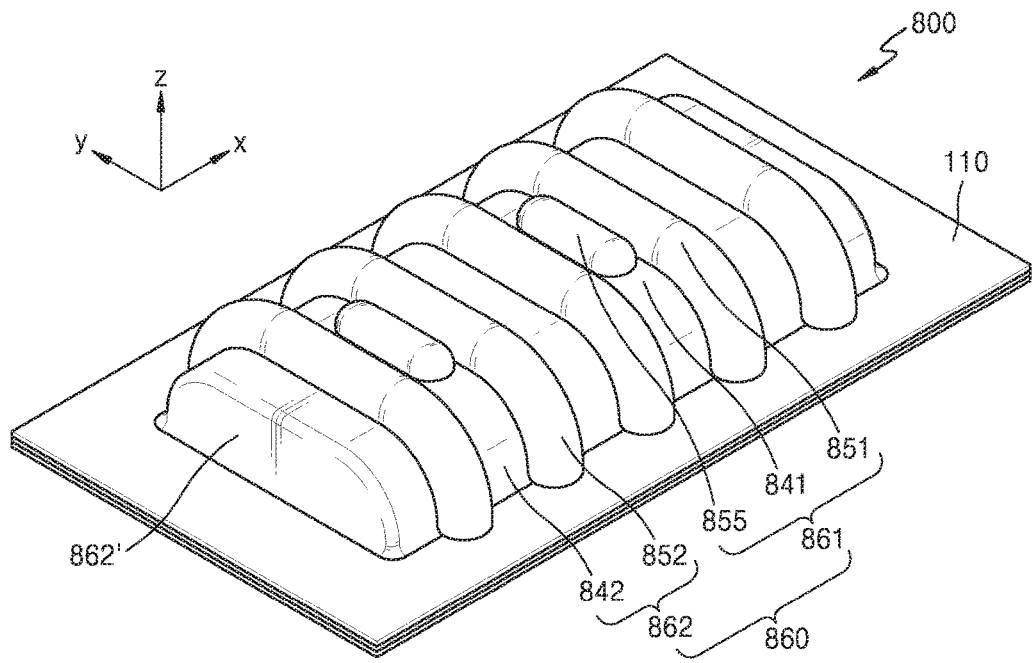
FIG. 16 is a perspective view of a hermetic packaging member for an electrochemical device according to another alternative exemplary embodiment.

FIG. 16 is a perspective view of a hermetic packaging member for an electrochemical device according to another alternative exemplary embodiment.

Referring to FIG. 16, in an exemplary embodiment, a hermetic packaging member 800 may include an edge unit 110 and a receiving unit 860 protruded to have a predetermined depth from the edge unit 110 in the thickness direction of the hermetic packaging member 800. The receiving unit 860 may include a plateau portion 861 and slope portions 862 and 862' disposed to surround the plateau portion 861. The slope portions 862 and 862' may be located at the edge of the receiving unit 860 and connected to the edge unit 110.

The slope portion 860 located at the sides of the receiving unit 862 in the width-direction may include a plurality of ridges 852 and a plurality of valleys 842. The ridges 852 of the slope portion 862 may be arranged in the length direction of the receiving unit 860. In such an embodiment, the ridges 852 may be spaced apart from each other in the length direction of the receiving unit 860, and the valleys 842 may be defined between the ridges 852. The ridges 852 of the slope portion 862 may extend in the direction that is substantially parallel to the width direction of the receiving unit 860. The ridges 852 of the slope portion 862 may extend from the boundary region between the slope portion 862 and the edge unit 110. In an exemplary embodiment, the ridges 852 may continuously extend from the boundary region between the slope portion 862 and the edge unit 110 to the boundary between the slope portion 862 and the plateau portion 861.

The plateau portion 861 may include a plurality of ridges 851, a plurality of valleys 841, and a protrusion 855. The ridges 851 of the plateau portion 861 may extend in the direction that is substantially parallel to the width direction of the receiving unit 860. The ridges 851 may be arranged to be spaced apart from each other in the length direction of the receiving unit 860. In an exemplary embodiment, the ridges 851 may be arranged to be spaced apart from each other in the width direction of the receiving unit 860, and the ridges 851 of the plateau portion 861 may be connected to the ridges 852 of the slope portion 862.

The protrusion 855 may be disposed at a valley 841 of the plateau portion 861, e.g., at a valley 841 between the ridges 851 spaced apart from each other in the width direction of the receiving unit 860. The protrusion 855 may extend to be parallel to the width direction of the receiving unit 860. In such an embodiment, the number and positions of protrusions 855 may vary.

Figure 17:
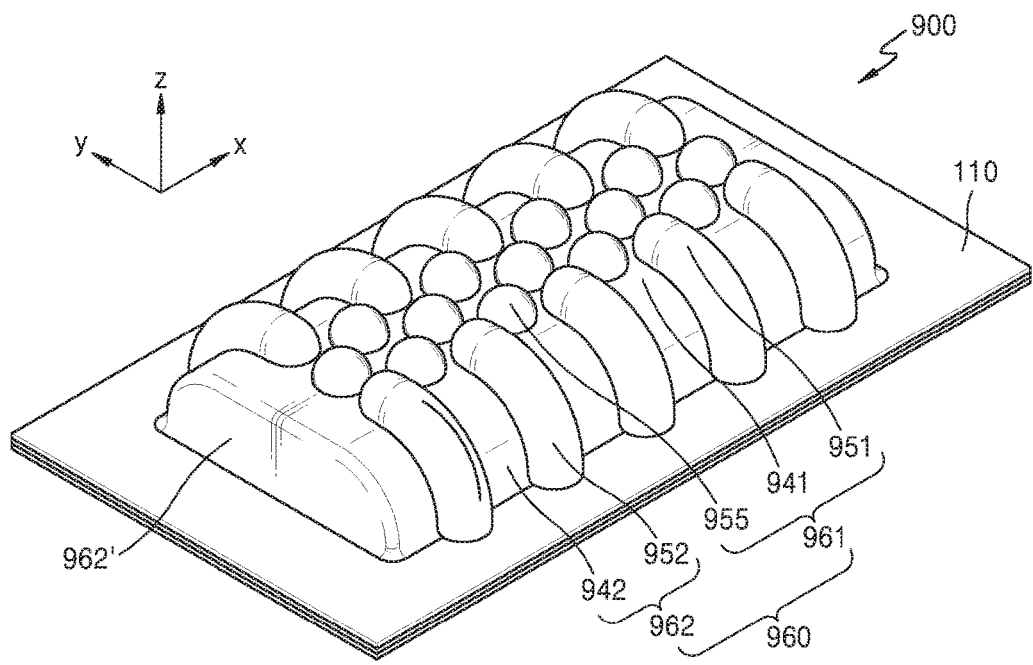
FIG. 17 is a perspective view of a hermetic packaging member for an electrochemical device according to another alternative exemplary embodiment.

FIG. 17 is a perspective view of a hermetic packaging member for an electrochemical device according to another alternative exemplary embodiment.

Referring to FIG. 17, in an exemplary embodiment, a hermetic packaging member 900 may include an edge unit 110 and a receiving unit 960 protruded to have a predetermined depth from the edge unit 110 in the thickness direction of the hermetic packaging member 900. The receiving unit 960 may include a plateau portion 961 and slope portions 962 and 962' disposed to surround the plateau portion 961.

The slope portion 962 located at the sides of the receiving unit 960 in the width-direction may include a plurality of ridges 952 and a plurality of valleys 942. The ridges 952 of the slope portion 962 may be arranged in the length direction of the receiving unit 960. The ridges 952 of the slope portion 962 may extend in the direction that is substantially parallel to the width direction of the receiving unit 960. The ridges 952 of the slope portion 962 may extend from the boundary region between the slope portion 962 and the edge unit 110. In an exemplary embodiment, the ridges 952 may continuously extend from the boundary region between the slope portion 962 and the edge unit 110 to the boundary between the slope portion 962 and the plateau portion 961.

The plateau portion 961 may include a plurality of ridges 951, a plurality of valleys 941, and a protrusion 955. The ridges 951 of the plateau portion 961 may extend in the direction that is substantially parallel to the width direction of the receiving unit 960. The ridges 951 may be arranged to be spaced apart from each other in the length direction of the receiving unit 960, the ridges 951 may be arranged to be spaced apart from each other in the width direction of the receiving unit 960, and the ridges 951 of the plateau portion 961 may be connected to the ridges 952 of the slope portion 962.

The protrusion 955 may be disposed at a valley 941 of the plateau portion 961, e.g., at the valley 941 between the ridges 951 spaced apart from each other in the width direction of the receiving unit 960. The protrusion 955 may be formed in a dot shape. In such an embodiment, the number and positions of protrusions 955 may vary. Exemplary embodiments of the hermetic packaging member illustrated in FIGS. 11A to 17 are merely exemplary, and the hermetic packaging member may be variously modified to be implemented in various exemplary embodiments of the electrochemical device.

In an exemplary embodiment, as described above, by pre-forming the receiving unit receiving the electrode assembly to the predetermined depth in the thickness direction from the edge unit in the hermetic packaging member through the molding process and forming the plurality of ridges at the slope portion of the receiving unit, the electrochemical device including the hermetic packaging member may have high durability even against the repetitive strain applied from the outside thereof. In such an embodiment, since the receiving unit receiving the electrode assembly is pre-formed to the predetermined depth in the thickness direction from the edge unit in the hermetic packaging member before the packaging of the electrode assembly, even the relatively thick electrode assembly may be packaged. In such an embodiment, since the slope portion may be at the relatively high angle, the area occupied by the slope portion may be reduced and thus the space of the electrochemical device may be efficiently used.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A hermetic packaging member for packaging and sealing an electrode assembly of an electrochemical device, the hermetic packaging member comprising:
   an edge unit; and
   a receiving unit having a predetermined depth in a thickness direction of the hermetic packaging member from the edge unit to receive the electrode assembly therein, wherein the edge unit surrounds the receiving unit when viewed from a plan view in the thickness direction,
   wherein the receiving unit comprises:
      a slope portion connected to the edge unit; and
      a plateau portion connected to the slope portion,
      wherein the slope portion comprises a plurality of ridges and a plurality of valleys defined between the plurality of ridges, and
      wherein the plateau portion of the receiving unit protrudes from the edge unit in a thickness direction of the edge unit.

2. The hermetic packaging member of claim 1, further comprising:
   a gas barrier layer on which the ridges and the valleys are defined.

3. The hermetic packaging member of claim 2, wherein the ridges extend from a boundary region between the slope portion and the edge unit.

4. The hermetic packaging member of claim 2, wherein the ridges are spaced apart from each other in a length direction of the hermetic packaging member.

5. The hermetic packaging member of claim 2, wherein the ridges extend in a direction substantially parallel to a width direction of the hermetic packaging member.

6. The hermetic packaging member of claim 2, wherein a surface of the gas barrier layer located at the slope portion has a minimum curvature radius of about 100 micrometers or greater.

7. The hermetic packaging member of claim 2, wherein the ridges continuously extend from a boundary region between the edge unit and the slope portion to a boundary between the slope portion and the plateau portion.

8. The hermetic packaging member of claim 2, wherein the plateau portion comprises a plurality of ridges and a plurality of valleys defined between the ridges.

9. The hermetic packaging member of claim 8, wherein a ridge of the ridges of the slope portion is connected to a ridge of the ridges of the plateau portion.

10. The hermetic packaging member of claim 2, wherein the ridges have a convex shape in a boundary region between the plateau portion and the slope portion.

11. The hermetic packaging member of claim 2, wherein the valleys are located below a plateau portion surface in a boundary region between the plateau portion and the slope portion.

12. An electrochemical device comprising:
   an electrode assembly;
   a hermetic packaging member for packaging and sealing the electrode assembly,
   wherein the hermetic packaging member comprises:
      an edge unit; and
      a receiving unit having a predetermined depth in a thickness direction from of the hermetic packaging member the edge unit to receive the electrode assembly therein, wherein the edge unit surrounds the receiving unit when viewed from a plan view in the thickness direction, and
   the receiving unit comprises:
      a slope portion connected to the edge unit; and
      a plateau portion connected to the slope portion,
      wherein the slope portion comprises a plurality of ridges and a plurality of valleys defined between the plurality of ridges, and
      wherein the plateau portion of the receiving unit protrudes from the edge unit in a thickness direction of the edge unit.

13. The electrochemical device of claim 12, wherein the hermetic packaging member further comprises a gas barrier layer on which the ridges and the valleys are defined.

14. The electrochemical device of claim 13, wherein the ridges extend from a boundary region between the slope portion and the edge unit.

15. The electrochemical device of claim 13, wherein
   the ridges extend in a direction substantially parallel to a width direction of the hermetic packaging member, and
   the ridges are spaced apart from each other in a direction parallel to a length direction of the hermetic packaging member.

16. The electrochemical device of claim 13, wherein the ridges continuously extend from a boundary region between the edge unit and the slope portion to a boundary between the slope portion and the plateau portion.

17. The electrochemical device of claim 13, wherein the plateau portion comprises a plurality of ridges and a plurality of valleys defined between the ridges.

18. The electrochemical device of claim 12, wherein the hermetic packaging member comprises a first hermetic packaging member which covers a top surface of the electrode assembly and a second hermetic packaging member which covers a bottom surface of the electrode assembly.

19. The electrochemical device of claim 18, wherein each of the first and second hermetic packaging members comprises the ridges and the valleys.

20. The electrochemical device of claim 18, wherein
   the first hermetic packaging member comprises the ridges and the valleys, and
   the second hermetic packaging member has a flat shape.

* * * * *